(12) United States Patent
Munezuka et al.

(10) Patent No.: US 11,967,814 B2
(45) Date of Patent: Apr. 23, 2024

(54) ELECTRICAL JUNCTION BOX

(71) Applicant: Yazaki Corporation, Tokyo (JP)

(72) Inventors: Masato Munezuka, Kakegawa (JP);
Masayo Matsuura, Kakegawa (JP);
Eisuke Suzuki, Tokyo (JP)

(73) Assignee: Yazaki Corporation, Tokyo (JP)

( * ) Notice: Subject to any disclaimer, the term of this patent is extended or adjusted under 35 U.S.C. 154(b) by 372 days.

(21) Appl. No.: 17/474,312

(22) Filed: Sep. 14, 2021

(65) Prior Publication Data

US 2022/0085587 A1 Mar. 17, 2022

(30) Foreign Application Priority Data

Sep. 14, 2020 (JP) ................................ 2020-153776

(51) Int. Cl.
| | | |
|---|---|---|
| *H02G 3/16* | (2006.01) | |
| *B60R 16/023* | (2006.01) | |
| *H02G 3/08* | (2006.01) | |
| *H02G 3/14* | (2006.01) | |

(52) U.S. Cl.
CPC ........... *H02G 3/16* (2013.01); *B60R 16/0238* (2013.01); *H02G 3/083* (2013.01); *H02G 3/14* (2013.01)

(58) Field of Classification Search
CPC . H02G 3/16; H02G 3/083; H02G 3/14; B60R 16/0238
See application file for complete search history.

(56) References Cited

U.S. PATENT DOCUMENTS

| | | |
|---|---|---|
| 3,828,120 A | 8/1974 | Hansen |
| 2013/0028683 A1 | 1/2013 | I et al. |
| 2015/0047895 A1* | 2/2015 | Doushita et al. ........ H02G 3/24 |
| | | 174/480 |
| 2018/0019532 A1* | 1/2018 | Uenosono et al. .......................... |
| | | H01R 13/4368 |
| 2019/0259511 A1 | 8/2019 | Ooi et al. |
| 2021/0226358 A1* | 7/2021 | Yamamoto ............. H01R 4/302 |

FOREIGN PATENT DOCUMENTS

| | | |
|---|---|---|
| DE | 4210202 A1 | 9/1993 |
| JP | 2013-031293 A | 2/2013 |
| JP | 2016-025734 A | 2/2016 |
| JP | 2016025734 A * | 2/2016 |
| JP | 2020-005328 A | 1/2020 |
| JP | 2020-053378 A | 4/2020 |

\* cited by examiner

*Primary Examiner* — Abdullah A Riyami
*Assistant Examiner* — Amara Anderson
(74) *Attorney, Agent, or Firm* — Banner & Witcoff, Ltd.

(57) ABSTRACT

An electrical junction box includes a housing, a bus bar, a nut, and an insulating cap. A through hole of the housing has a first end side and a second end side, and the first end side is opened in a bus bar placement surface of the housing. The bus bar is placed on the bus bar placement surface and is fixed to the housing such that a first bolt hole of the bus bar and the through hole communicate with each other. The cap is attached to the housing. A terminal having a second bolt hole is fixed to the bus bar by fastening a bolt inserted into the second bolt hole and the first bolt hole in this order to the nut so as to sandwich the bus bar and the terminal.

2 Claims, 3 Drawing Sheets

ELECTRICAL JUNCTION BOX

CROSS-REFERENCE TO RELATED APPLICATIONS

This application is based on and claims priority under 35 USC 119 from Japanese Patent Application No. 2020-153776 filed on Sep. 14, 2020, the contents of which are incorporated herein by reference.

TECHNICAL FIELD

The present disclosure relates to an electrical junction box.

BACKGROUND ART

In the related art, for example, an electrical junction box assembled to a vehicle battery and connected between the battery and various electrical components has been proposed. For example, one of related-art electrical junction boxes includes a housing having a bus bar placement surface in which a first end side of a hole accommodating a nut is opened, in which a plate-shaped terminal connected to a battery or the like is disposed so as to overlap a plate-shaped bus bar assembled to the bus bar placement surface, and the terminal is fixed to the bus bar by fastening a bolt that is inserted into a bolt hole of the bus bar and a bolt hole of the terminal to a nut so as to sandwich the bus bar and the terminal (see, for example, JP-A-2013-31293 and JP-A-2020-5328).

It is assumed that a through hole is adopted as a hole having a first end side opened in a bus bar placement surface, and a nut is inserted into the through hole through an opening at a second end side of the through hole and accommodated in the through hole. In this case, before the bolt is fastened to the nut, the nut accommodated in the through hole may unintentionally come off from the opening at the second end side of the through hole.

Further, after the bolt is fastened to the nut, a tip end surface of a leg portion of the bolt positioned inside the through hole is exposed to the outside via the opening at the second end side of the through hole. Therefore, for example, in a case where a housing (a vehicle body panel or the like) having conductivity of a peripheral component disposed in the vicinity of the electrical junction box is disposed close to the opening at the second end side of the through hole, there is a concern that insulating properties between the tip end surface of the leg portion of the bolt and the housing of the peripheral component facing each other cannot be sufficiently ensured.

From the viewpoint of improving assemblability of the electrical junction box, it is desirable to suppress the nut from coming off. Further, even if the housing having conductivity of the peripheral component is disposed close to the opening at a second end side of the through hole, it is desirable to sufficiently ensure the insulating properties between the tip end surface of the leg portion of the bolt and the housing of the peripheral component.

SUMMARY

The present disclosure has been made in view of the above circumstances, and an object thereof is to provide an electrical junction box having good assemblability and capable of sufficiently ensuring insulating properties between a peripheral component and a bolt.

In order to achieve the above object, there is provided an electrical junction box including:

a housing having a bus bar placement surface and a through hole, in which the through hole has a first end side and a second end side opposite to the first end side in an axis direction of the through hole and the first end side is opened in the bus bar placement surface;

a bus bar having a plate shape and having a first bolt hole that has a hole diameter smaller than a hole diameter of the through hole, the bus bar configured to be placed on the bus bar placement surface and configured to be fixed to the housing such that the first bolt hole and the through hole communicate with each other;

a nut configured to be inserted from an opening of the second end side of the through hole and configured to be accommodated in the through hole; and a cap having insulating properties and configured to be attached to the housing to close the opening of the second end side of the through hole, in which a terminal having a plate shape and having a second bolt hole is fixed to the bus bar by fastening a bolt inserted into the second bolt hole and the first bolt hole in this order to the nut so as to sandwich the bus bar and the terminal that is disposed so as to overlap the bus bar.

As described above, according to the present disclosure, it is possible to provide an electrical junction box having good assemblability and capable of sufficiently ensuring insulating properties between a peripheral component and a bolt.

The present disclosure has been briefly described as above. Further, details of the present disclosure will be further clarified by reading a mode for carrying out the invention described below with reference to the accompanying drawings.

DESCRIPTION OF EMBODIMENTS

Embodiment

Hereinafter, an electrical junction box 1 according to an embodiment of the present disclosure illustrated in FIGS. 1 to 3 will be described with reference to the drawings. The electrical junction box 1 is used by being assembled to, for example, a vehicle battery, and has a function of electrically connecting the battery to an in-vehicle electrical component via a bus bar, a relay, or the like.

Figure 1:
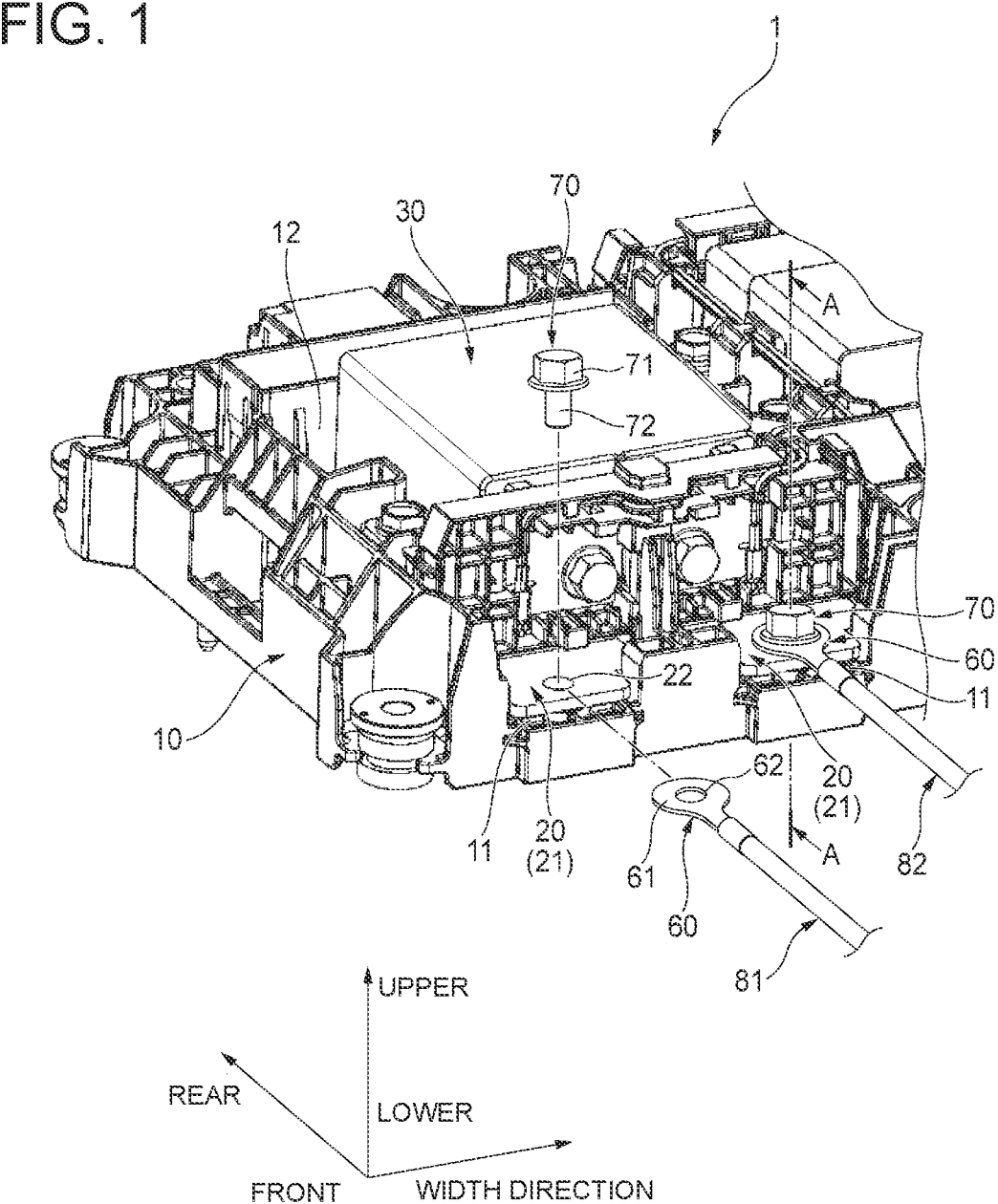
FIG. 1 is a perspective view illustrating a part of an electrical junction box according to an embodiment of the present disclosure.

Hereinafter, for convenience of description, a "front-rear direction", a "width direction", an "upper-lower direction", "front", "rear", "upper", and "lower" are defined as illustrated in FIG. 1. The "front-rear direction", the "width direction", and the "upper-lower direction" are orthogonal to each other. The upper-lower direction coincides with the upper-lower direction of the vehicle on which the electrical junction box 1 is mounted.

Figure 2:
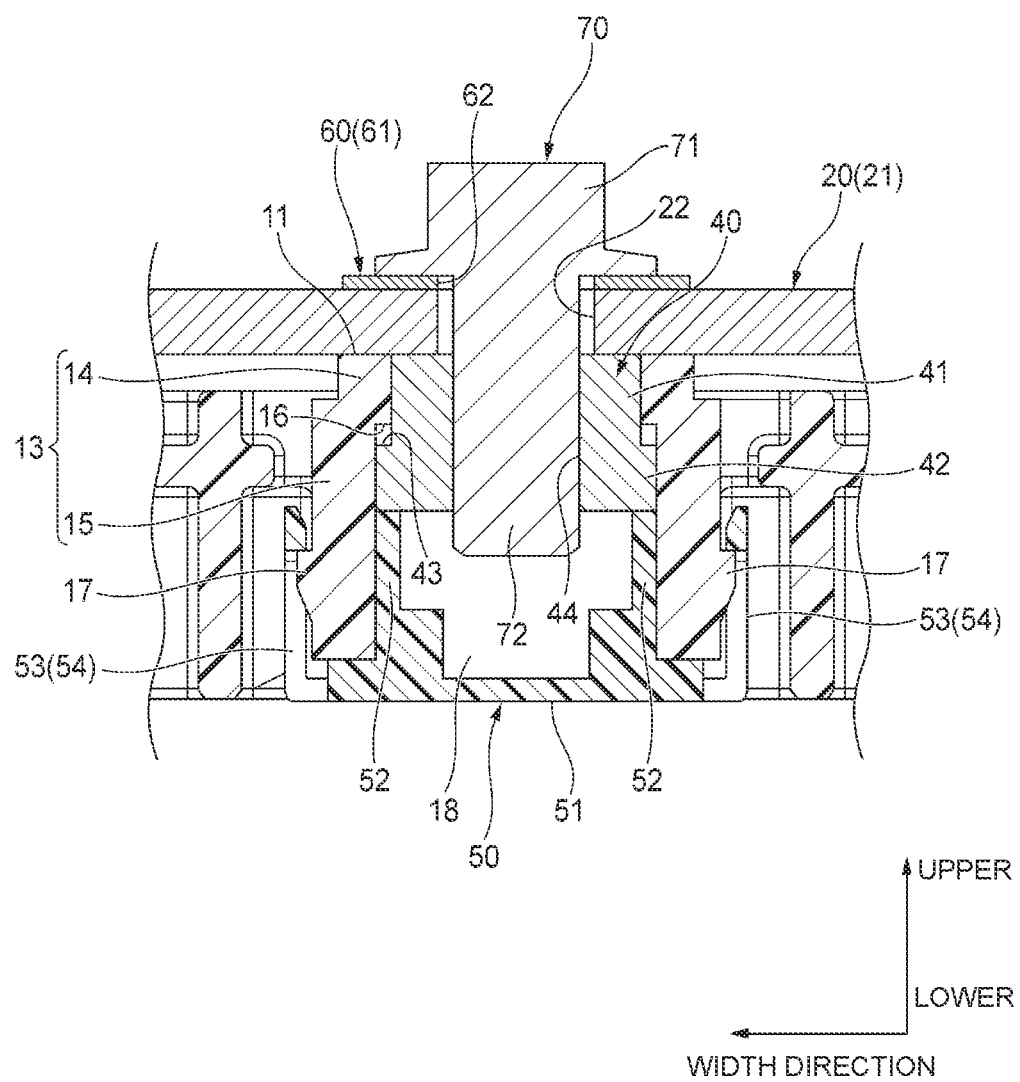
FIG. 2 is a cross-sectional view taken along a line A-A in FIG. 1.
Figure 3:
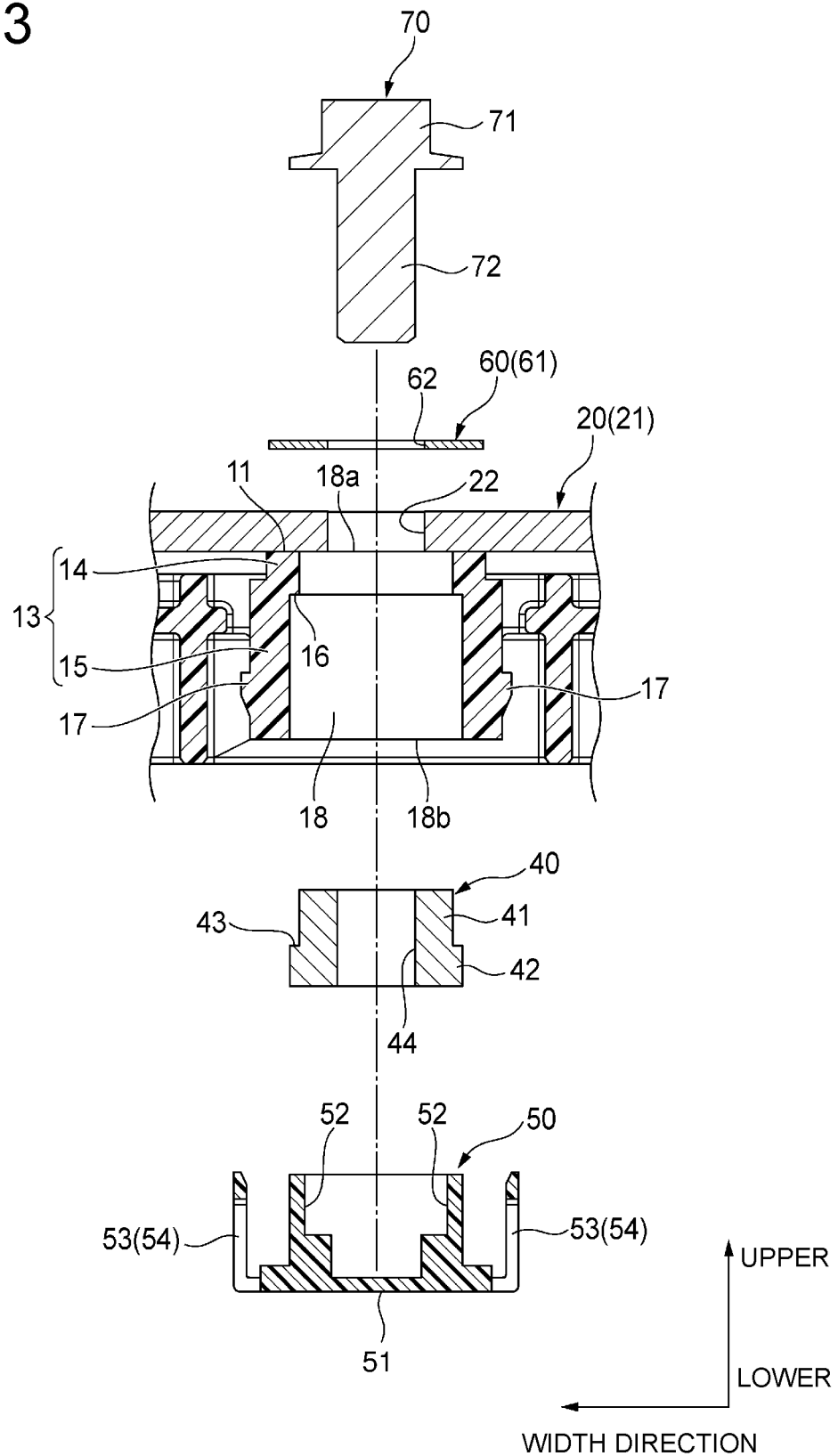
FIG. 3 is a cross-sectional view corresponding to FIG. 2 in a state where members are separated.

As illustrated in FIGS. 1 to 3, the electrical junction box 1 includes a housing 10, a pair of bus bars 20 assembled to the housing 10, a relay box 30 assembled to the housing 10, nuts 40 each accommodated in a tubular portion 13 to be described later of the housing 10, and caps 50 each attached to the tubular portion 13. Hereinafter, a configuration of each component of the electrical junction box 1 will be described in order.

First, the housing 10 will be described. The housing 10 is a resin molded body, and as illustrated in FIG. 1, has a substantially rectangular flat plate shape that extends in the front-rear direction and the width direction and is long in the width direction. In a region on one side in the width direction of the housing 10 with respect to a center in the width direction, a pair of bus bar placement surfaces 11 (also see FIGS. 2 and 3) are formed at a front end portion so as to be arranged at an interval in the width direction, and a relay box accommodating portion 12 is formed adjacent to a rear side of the pair of bus bar placement surfaces 11. Each of the pair of bus bar placement surfaces 11 is a flat surface extending in the front-rear direction and the width direction and exposed upward, and the relay box accommodating portion 12 is a concave portion recessed downward and opened upward.

As illustrated in FIG. 2 which is a cross-sectional view taken along a line A-A of FIG. 1, the housing 10 is firmed with the tubular portion 13 extending downward from each bus bar placement surface 11. The tubular portion 13 defines a through hole 18 having an upper end opened in the bus bar placement surface 11 and penetrating in the upper-lower direction.

As illustrated in FIGS. 2 and 3, the tubular portion 13 includes an upper tubular portion 14 extending downward from the bus bar placement surface 11 and a lower tubular portion 15 continuous with a lower side of the upper tubular portion 14. The upper tubular portion 14 has, for example, a cylindrical shape extending in the upper-lower direction, and the lower tubular portion 15 has, for example, a rectangular tubular shape extending in the upper-lower direction.

A stepped surface 16 facing downward is provided at a boundary portion between an inner wall surface (cylindrical inner wall surface) of the upper tubular portion 14 and an inner wall surface (rectangular tubular inner wall surface) of the lower tubular portion 15. Locking protrusions 17 protruding outward are formed at a plurality of locations (for example, four outer wall surfaces of the rectangular tubular lower tubular portion 15) in a circumferential direction of an outer peripheral surface of the tubular portion 13 (more specifically, the lower tubular portion 15). An upper edge portion of an opening 54 of a protruding portion 53, which will be described later, of the cap 50 is locked to the locking protrusion 17 (see FIG. 2).

Next, the pair of bus bars 20 will be described. Each bus bar 20 is formed by performing press working, bending, or the like on one metal plate. As illustrated in FIG. 1, each bus bar 20 includes a flat plate-shaped horizontal portion 21 extending in the front-rear direction and the width direction. A bolt hole 22 penetrating in the upper-lower direction is formed in the horizontal portion 21. An inner diameter of the bolt hole 22 is smaller than an inner diameter of the through hole 18 (more precisely, an inner diameter of the upper tubular portion 14).

As illustrated in FIG. 1, each of the pair of bus bars 20 is assembled and fixed to the housing 10 such that the horizontal portion 21 is placed on the corresponding bus bar placement surface 11 of the housing 10 and the bolt hole 22 and the through hole 18 are coaxially arranged (vertically communicate with each other).

In a state where the bus bar 20 is fixed to the housing 10, as illustrated in FIG. 2, a lower face of the horizontal portion 21 of the bus bar 20 is in close contact with the bus bar placement surface 11, Since the inner diameter of the bolt hole 22 is smaller than the inner diameter of the through hole 18 (more precisely, the inner diameter of the upper tubular portion 14), a lower edge portion of the bolt hole 22 of the bus bar 20 is exposed to the inside of the through hole 18 over an entire circumference. In other words, a peripheral edge of an upper end opening 18a (see FIG. 3) of the through hole 18 is closed by the bus bar 20 over the entire circumference.

A terminal 60 connected to an end of an electric wire 81 extending from a battery mounted on the vehicle is connected to the horizontal portion 21 of one bus bar 20 of the pair of bus bars 20 assembled to the housing 10 as described above, and a terminal 60 connected to an end of an electric wire 82 extending from an electrical component mounted on the vehicle is connected to the horizontal portion 21 of the other bus bar 20 (see FIG. 1). As will be described later, these terminals 60 are connected and fixed to the bus bars 20 by fastening the bolts 70 to the nuts 40 accommodated in the through hole 18 (see FIG. 2, which will be described later).

Next, the relay box 30 will be described. The relay box 30 has a substantially rectangular parallelepiped shape, and various relays, fuses, or the like (not illustrated) are built in the relay box 30. The relay box 30 is assembled to the relay box accommodating portion 12 of the housing 10 from above and is fixed to the housing 10. The relay box 30 assembled to the housing 10 (therefore, various relays or the like built therein) and the pair of bus bars 20 are electrically connected to each other by an electric circuit (not illustrated).

Next, the nut 40 will be described. The nut 40 is a metal component formed by forging or the like. As illustrated in FIGS. 2 and 3, the nut 40 includes an upper portion 41 having an outer peripheral shape corresponding to the inner wall surface of the upper tubular portion 14, and a lower portion 42 having an outer peripheral shape corresponding to the inner wall surface of the lower tubular portion 15 and continuous to a lower side of the upper portion 41. A stepped surface 43 facing upward is provided at a boundary portion between an outer wall surface (cylindrical outer wall surface) of the upper portion 41 and an outer wall surface (rectangular tubular outer wall surface) of the lower portion 42. A female screw portion 44 penetrating in the upper-lower direction is formed in the nut 40. The nut 40 having the above-described shape can be inserted into the through hole 18 from a lower end opening 18b of the through hole 18, but cannot be inserted into the through hole 18 from the upper end opening 18a of the through hole 18.

Next, the cap 50 will be described. The cap 50 is a molded body made of a material having insulating properties (typically, a resin). The cap 50 includes a flat plate-shaped lid portion 51 having a shape (for example, a rectangular shape) corresponding to a lower end opening of the lower tubular portion 15 of the housing 10 (that is, the lower end opening 18b of the through hole 18 (see FIG. 3)) and extending in the front-rear direction and the width direction.

The lid portion 51 is provided with a plurality of support pieces 52 protruding upward from a plurality of locations on an upper face of the lid portion 51 and corresponding to an inner peripheral surface of the lower tubular portion 15 (for example, four inner wall surfaces of the rectangular tubular lower tubular portion 15). Further, the lid portion 51 is provided with the plurality of protruding portions 53 protruding upward from a plurality of locations on an outer peripheral edge portion of the lid portion 51 and corresponding to the outer peripheral surface of the lower tubular portion 15 (for example, four outer wall surfaces of the rectangular tubular lower tubular portion 15). Each of the protruding portions 53 is formed with an opening 54 penetrating in a thickness direction of the protruding portion 53 and extending in the upper-lower direction. Each protruding portion 53 is elastically deformable in the thickness direction.

As illustrated in FIGS. 2 and 3, the nut 40 is inserted into and accommodated in the through hole 18 from the lower end opening of the lower tubular portion 15 of the housing 10 (that is, the lower end opening 18b of the through hole 18). After the nut 40 is accommodated in the through hole 18, in order to prevent the nut 40 from coming off from the through hole 18, the cap 50 is attached to the lower tubular portion 15 so as to close the lower end opening 18b of the through hole 18.

Specifically, as illustrated in FIG. 2, the lid portion 51 of the cap 50 is moved closer to a lower end surface of the lower tubular portion 15 from below such that the plurality of protruding portions 53 of the cap 50 extend along the outer peripheral surface of the lower tubular portion 15 and the plurality of support pieces 52 of the cap 50 extend along the inner peripheral surface of the lower tubular portion 15. In this process, the nut 40 is pushed upward in the through hole 18 by the plurality of support pieces 52 entering the through hole 18.

Immediately before the lid portion 51 comes into contact with the lower end surface of the lower tubular portion 15, the upper edge portion of the opening 54 of the protruding portion 53 is temporarily elastically deformed in a direction away from the outer peripheral surface of the lower tubular portion 15 by the pressing from the locking protrusion 17. Then, when the lid portion 51 comes into contact with the lower end surface of the lower tubular portion 15, the upper edge portion climbs over the locking protrusion 17, so that the protruding portion 53 elastically returns in a direction approaching the outer peripheral surface of the lower tubular portion 15, and the locking protrusion 17 and the upper edge portion of the opening 54 of the protruding portion 53 are locked in the upper-lower direction. Accordingly, the cap 50 is completely attached to the lower tubular portion 15, and the cap 50 is prevented from coming off from the lower tubular portion 15, In addition, since the lid portion 51 of the cap 50 closes the lower end opening 18b of the through hole 18, the nut 40 is prevented from coming off from the through hole 18.

In a state where the attachment of the cap 50 to the lower tubular portion 15 is completed, as illustrated in FIG. 2, the upper portion 41 of the nut 40 pushed up by the plurality of support pieces 52 is accommodated in the upper tubular portion 14, and the lower portion 42 of the nut 40 is accommodated in the lower tubular portion 15. The lower portion 42 of the nut 40 is accommodated in the lower tubular portion 15, so that the nut 40 is not rotatable with respect to the through hole 18. An upper end surface of the nut 40 is flush with the bus bar placement surface 11 and is in contact with the lower edge portion of the bolt hole 22 of the bus bar 20 in close contact with the bus bar placement surface 11. The stepped surface 43 of the nut 40 and the stepped surface 16 of the tubular portion 13 face each other in the upper-lower direction with a gap therebetween. The configuration of the electrical junction box 1 has been described above.

The terminal 60 connected to the end of the electric wire 81 extending from the battery mounted on the vehicle is connected to the horizontal portion 21 of the one bus bar 20 of the pair of bus bars 20 fixed to the housing 10 of the electrical junction box 1, and the terminal 60 connected to the end of the electric wire 82 extending from the electrical component mounted on the vehicle is connected to the horizontal portion 21 of the other bus bar 20 (see FIG. 1).

The connection and fixation of each terminal 60 to the corresponding bus bar 20 are performed as follows. First, the flat plate portion 61 of the terminal 60 is placed on the horizontal portion 21 of the bus bar 20. Next, a leg portion (male screw portion) 72 of the bolt 70 is inserted through the bolt hole 62 formed in the flat plate portion 61 and the bolt hole 22 of the bus bar 20 in this order, and is screwed to the female screw portion 44 of the nut 40 in the through hole 18. Next, the bolt 70 is tightened with a specified torque. Accordingly, as illustrated in FIG. 2, the bolt 70 and the nut 40 are fastened such that the horizontal portion 21 of the bus bar 20 and the flat plate portion 61 of the terminal 60 are sandwiched between the head portion 71 of the bolt 70 and the upper end surface of the nut 40, so that the terminal 60 is fixed to and electrically connected to the bus bar 20.

Accordingly, the battery is electrically connected to the electrical component via the electric wire 81, the one terminal 60, the one bus bar 20, the relay box 30, the other bus bar 20, the other terminal 60, and the electric wire 82. In this state, by operating the relays or the like in the relay box 30 of the electrical junction box 1, electric power generated by the battery is supplied to the electrical component.

Further, even in a case where a housing (a vehicle body panel or the like) having conductivity of a peripheral component disposed in the vicinity of the electrical junction box 1 is disposed close to the lower end opening 18b of the through hole 18, the cap 50 having insulating properties is interposed between a tip end surface of a leg portion 72 of the bolt 70 positioned inside the through hole 18 and the housing of the peripheral component. Therefore, the insulating properties can be sufficiently ensured between the tip end surface of the leg portion 72 of the bolt 70 and the housing of the peripheral component.

<Operation and Effect>

As described above, according to the electrical junction box 1 of the present embodiment, the lower end opening 18b of the through hole 18 in which the nut 40 is accommodated is closed by the cap 50 attached to the housing 10. Accordingly, before the bolt 70 is fastened to the nut 40, the nut 40 accommodated in the through hole 18 is prevented from unintentionally coming off from the lower end opening 18b of the through hole 18, and the assembly ability of the electrical junction box 1 is improved. Further, even in a case where the housing (a vehicle body panel or the like) having conductivity of the peripheral component is disposed close to the lower end opening 18h of the through hole 18 after the bolt 70 is fastened to the nut 40, the cap 50 having the insulating properties is interposed between the tip end surface of the leg portion 72 of the bolt 70 positioned inside the through hole 18 and the housing of the peripheral component. Therefore, the insulating properties can be sufficiently ensured between the tip end surface of the leg portion 72 of the bolt 70 and the housing of the peripheral component. Therefore, according to the electrical junction box 1 of the present embodiment, it is possible to sufficiently ensure good assemblability and the insulating properties between the peripheral component and the bolt 70.

Further, according to the electrical junction box 1 of the present embodiment, the nut 40 accommodated in the through hole 18 can be supported so as to be positioned in the vicinity of the upper end opening 18a of the through hole 18 (accordingly, in the vicinity of the edge portion of the bolt hole 22 of the bus bar 20) by the support pieces 52 protruding upward from the lid portion 51 of the cap 50. Therefore, compared to a case where the nut 40 is positioned in the vicinity of the lower end opening 18b of the through hole 18 (accordingly, away from the edge portion of the bolt hole 22 of the bus bar 20), the bolt 70 inserted through the bolt hole 62 of the terminal 60 and the bolt hole 22 of the bus bar 20 in this order can be easily screwed into the nut 40.

Further, according to the electrical junction box 1 of the present embodiment, by engaging the upper edge portion of the opening 54 of the protruding portion 53 of the cap 50 with the locking protrusions 17 formed on the outer peripheral surface of the tubular portion 13 of the housing 10, the locking mechanism that prevents the cap 50 from being separated from the housing 10 is configured. Therefore, unintended separation of the cap 50 from the housing 10 can be reliably prevented.

Other Embodiments

The present disclosure is not limited to the above-described embodiment and various modifications can be used within the scope of the present disclosure. For example, the present disclosure is not limited to the above-described embodiment, and may be appropriately modified, improved or the like. In addition, materials, shapes, dimensions, numbers, arrangement locations, and the like of components in the embodiment described above are optional and are not limited as long as the present disclosure can be achieved.

In the above-described embodiment, by engaging the plurality of protruding portions 53 protruding upward from the plurality of locations of the outer peripheral edge portion of the lid portion 51 of the cap 50 with the plurality of locking protrusions 17 formed on the outer peripheral surface of the tubular portion 13 of the housing 10 respectively, the locking mechanism that prevents the cap 50 from being separated from the housing 10 is configured. On the other hand, by bringing a tubular protruding portion that protrudes upward from the outer peripheral edge portion of the lid portion 51 of the cap 50 over the entire circumference and the outer peripheral surface of the tubular portion 13 of the housing 10 into close contact over the entire circumference, the locking mechanism that prevents the cap 50 from being separated from the housing 10 may be configured.

Further, in the above-described embodiment, as illustrated in FIG. 2, the lower face of the horizontal portion 21 of the bus bar 20 is in close contact with the bus bar placement surface 11. On the other hand, the lower face of the horizontal portion 21 of the bus bar 20 may be slightly floated from the bus bar placement surface 11 due to warpage or the like of the bus bar 20. In this case, the nut 40 relatively moves upward with respect to the through hole 18 so as to narrow the gap between the stepped surface 43 of the nut 40 and the stepped surface 16 of the tubular portion 13 by an amount corresponding to a floating amount of the bus bar 20 from the bus bar placement surface 11, so that a state in which the upper end surface of the nut 40 and the lower edge portion of the bolt hole 22 of the bus bar 20 are in pressure contact with each other can be maintained.

Here, characteristics of the embodiment of the electrical junction box 1 according to the present disclosure described above are summarized briefly in the following [1] to [3].

[1] An electrical junction box (1) includes:
a housing (10) having a bus bar placement surface (11) and a through hole (18) in which the through hole (18) has a first end side and a second end side opposite to the first end side in an axis direction of the through hole (18) and the first end side is opened in the bus bar placement surface (11);
a bus bar (20) having a plate shape and having a first bolt hole (22) that has a hole diameter smaller than that of the through hole (18), the bus bar (20) configured to be placed on the bus bar placement surface (11) and configured to be fixed to the housing (10) such that the first bolt hole (22) and the through hole (18) communicate with each other;
a nut (40) configured to be inserted from an opening (18b) of the second end side of the through hole (18) and configured to be accommodated in the through hole (18); and
a cap (50) having insulating properties and configured to be attached to the housing (10) to close the opening (18b) at a second end side of the through hole (18),
in which a terminal (60) having a plate shape and having a second bolt hole is fixed to the bus bar (20) by fastening a bolt (70) inserted into the second bolt hole (62) and the first bolt hole (22) in this order to the nut (40) so as to sandwich the bus bar (20) and the terminal (60) that is disposed so as to overlap the bus bar (20).

[2] In the electrical junction box (1) according to [1],
the cap (50) includes a lid portion (51) configured to close the opening (18b of the second end side of the through hole (18), and a support piece (52) protruding from the lid portion (51) toward the first end side of the through hole (18) in the through hole (18) and supporting the nut (40).

[3] In the electrical junction box (1) according to [2],
the housing (10) includes a tubular portion (13) defining the through hole (18), the cap (50) includes a protruding portion (53) protruding from the lid portion (51) toward the first end side of the through hole (18) along an outer peripheral surface of the tubular portion (13), and
the protruding portion (53) and the outer peripheral surface (17) of the tubular portion (13) constitute a locking mechanism preventing the cap (50) from being separated from the housing (10).

According to the electrical junction box having a configuration of [1], the opening of the second end side of the through hole accommodating the nut is closed by the cap attached to the housing. Accordingly, before the bolt is fastened to the nut, the nut accommodated in the through hole is prevented from unintentionally coming off from the opening at the second end side of the through hole, and the assemblability of the electrical junction box is improved. Further, even in a case where the housing (a vehicle body panel or the like) having conductivity of the peripheral component is disposed close to the opening of the second end side of the through hole after the bolt is fastened to the nut, the cap having the insulating properties is interposed between the tip end surface of a leg portion of the bolt positioned inside the through hole and the housing of the peripheral component. Therefore, the insulating properties can be sufficiently ensured between the tip end surface of the leg portion of the bolt and the housing of the peripheral component. Therefore, according to the electrical junction box of the above-described configuration, it is possible to sufficiently ensure good assemblability and the insulating properties between the peripheral component and the bolt.

According to the electrical junction box having a configuration of [2], the nut accommodated in the through hole can be supported so as to be positioned in the vicinity of the opening of the first end side of the through hole (accordingly, in the vicinity of the edge portion of the first bolt hole of the bus bar) by the support piece protruding from the lid portion of the cap to the first end side of the through hole. Therefore, compared to a case where the nut is positioned in the vicinity of the opening at the second end side of the through hole (accordingly, away from the edge portion of the first bolt hole of the bus bar), the bolt inserted through the second bolt hole and the first bolt hole in this order can be easily screwed into the nut.

According to the electrical junction box having a configuration of [3], the protruding portion of the cap and an outer peripheral surface of the tubular portion of the housing constitute the locking mechanism by the lock members preventing the cap from being separated from the housing. Therefore, unintended separation of the cap from the housing can be reliably prevented.

What is claimed is:

1. An electrical junction box comprising:
    a housing having a bus bar placement surface and a through hole, wherein the through hole has a first end side and a second end side opposite to the first end side in an axis direction of the through hole and the first end side is opened in the bus bar placement surface;
    a bus bar having a plate shape and having a first bolt hole that has a hole diameter smaller than a hole diameter of the through hole, the bus bar configured to be placed on the bus bar placement surface and configured to be fixed to the housing such that the first bolt hole and the through hole communicate with each other;
    a nut configured to be inserted from an opening of the second end side of the through hole and configured to be accommodated in the through hole; and
    a cap having insulating properties and configured to be attached to the housing to close the opening of the second end side of the through hole,
    wherein a terminal having a plate shape and having a second bolt hole is fixed to the bus bar by fastening a bolt inserted into the second bolt hole and the first bolt hole in this order to the nut so as to sandwich the bus bar and the terminal that is disposed so as to overlap the bus bar,
    wherein the housing includes a tubular portion defining the through hole,
    wherein the cap includes a lid portion configured to close the opening of the second end side of the through hole, and a protruding portion protruding from the lid portion toward the first end side of the through hole along an outer peripheral surface of the tubular portion, and
    wherein the protruding portion and the outer peripheral surface of the tubular portion constitute a locking mechanism preventing the cap from being separated from the housing.

2. The electrical junction box according to claim 1, wherein the cap includes a support piece protruding from the lid portion toward the first end side of the through hole in the through hole and supporting the nut.

* * * * *